United States Patent
Thompson et al.

(10) Patent No.: US 11,947,330 B2
(45) Date of Patent: Apr. 2, 2024

(54) TOOL ORIENTATION SYSTEMS AND METHODS

(71) Applicant: The Boeing Company, Chicago, IL (US)

(72) Inventors: Brian Arthur Thompson, Media, PA (US); Jonathan T. Davis, Kennett Square, PA (US)

(73) Assignee: The Boeing Company, Chicago, IL (US)

( * ) Notice: Subject to any disclaimer, the term of this patent is extended or adjusted under 35 U.S.C. 154(b) by 1428 days.

(21) Appl. No.: 16/294,845

(22) Filed: Mar. 6, 2019

(65) Prior Publication Data

US 2020/0282501 A1   Sep. 10, 2020

(51) Int. Cl.
| | |
|---|---|
| *G05B 19/402* | (2006.01) |
| *B23Q 9/00* | (2006.01) |
| *B23Q 16/02* | (2006.01) |
| *B23Q 17/22* | (2006.01) |
| *B25F 5/00* | (2006.01) |

(52) U.S. Cl.
CPC ......... *G05B 19/402* (2013.01); *B23Q 9/0007* (2013.01); *B23Q 16/021* (2013.01); *B25F 5/00* (2013.01); *B23Q 17/22* (2013.01); *G05B 2219/37404* (2013.01); *G05B 2219/45127* (2013.01); *G05B 2219/50353* (2013.01)

(58) Field of Classification Search
CPC .... B23Q 17/22; B23Q 9/0007; B23Q 16/021; G05B 19/402; G05B 2219/37404; G05B 2219/45127; G05B 2219/50353; B25F 5/00; B23B 49/00
See application file for complete search history.

(56) References Cited

U.S. PATENT DOCUMENTS

| | | | | |
|---|---|---|---|---|
| 6,000,939 A * | 12/1999 | Ray | .................. | A61C 1/082 433/76 |
| 6,587,184 B2 * | 7/2003 | Wursch | .................. | G01S 17/88 7/163 |
| 6,845,279 B1 * | 1/2005 | Gilmore | .............. | G05B 19/406 70/57.1 |
| 6,925,725 B2 * | 8/2005 | Herrmann | .............. | B23Q 17/20 408/11 |
| 7,182,148 B1 * | 2/2007 | Szieff | .................. | B25H 1/0078 173/171 |
| 7,404,696 B2 * | 7/2008 | Campbell | ............ | B25H 1/0078 408/202 |
| 7,992,311 B2 * | 8/2011 | Cerwin | ................ | B25H 1/0092 33/286 |

(Continued)

FOREIGN PATENT DOCUMENTS

| | | |
|---|---|---|
| EP | 2085849 | 8/2009 |
| JP | 4288041 | 7/2009 |

*Primary Examiner* — John Fitzgerald
*Assistant Examiner* — Tania Courson
(74) *Attorney, Agent, or Firm* — Haynes and Boone, LLP

(57) ABSTRACT

Systems and methods for tool orientation and/or position determining system are described herein. In one example, a plurality of tool sensors can be coupled to a tool. The tool sensors can provide data to a control module or system controller. The orientation and/or position of the tool can accordingly be determined from the data. If the orientation and/or position of the tool matches a desired orientation, the tool and/or control module can provide an indication that the tool is in the desired orientation.

20 Claims, 5 Drawing Sheets

(56) References Cited

U.S. PATENT DOCUMENTS

| | | | |
|---|---|---|---|
| 9,114,493 B2 * | 8/2015 | Pettersson | B25H 1/0092 |
| 9,114,494 B1 * | 8/2015 | Mah | B25H 1/0092 |
| 9,144,875 B2 * | 9/2015 | Schlesak | B25F 5/024 |
| 10,806,525 B2 * | 10/2020 | McGinley | A61B 34/25 |
| 10,940,573 B2 * | 3/2021 | Shao | G01S 17/08 |
| 2003/0040871 A1 | 2/2003 | Siegel et al. | |
| 2009/0138116 A1 | 5/2009 | Austin et al. | |
| 2015/0187198 A1 | 7/2015 | Silverberg et al. | |
| 2019/0283196 A1 * | 9/2019 | Shao | G01S 17/87 |

* cited by examiner

TOOL ORIENTATION SYSTEMS AND METHODS

TECHNICAL FIELD

The disclosure relates generally to tooling systems and more specifically to systems and techniques that determine and communicate the orientation and positioning of the tooling systems.

BACKGROUND

Determining the orientation and positioning of tools used is important to maintain the quality of finished articles that are fabricated by the tools. For example, in a manufacturing process that utilizes a drill to drill holes on a substrate, the drill will typically need to be oriented at a specific angle relative to the surface being drilled as well as precise positioning of the drill on a desired position on the substrate.

Currently, automated manufacturing is performed by complicated robots. Such robots require programming and are very expensive, making them impractical and uneconomical for certain manufacturing techniques. Additionally, such robots are bulky and cannot be deployed in space limited facilities and cannot be quickly deployed.

SUMMARY

Systems and methods are disclosed for tool orientation and/or position sensing apparatus. The apparatus can include a first tool sensor configured to be coupled to a first portion of a tool, a second tool sensor configured to be coupled to a second portion of the tool, a third tool sensor configured to be coupled to a third portion of the tool, and a control module comprising a user interface. The control module can be configured to communicatively couple to the first tool sensor, the second tool sensor, and the third tool sensor. The control module can be further configured to receive, at a first timeframe, calibration data from the first tool sensor, the second tool sensor, and the third tool sensor, determine a calibration orientation of a major length of the tool from the calibration data, receive, at a second timeframe, orientation data from the first tool sensor, the second tool sensor, and the third tool sensor, determine, from the orientation data, whether the major length of the tool is oriented substantially similarly to the calibration orientation, and provide, by the user interface, an indication of whether the major length of the tool is oriented substantially similarly to the calibration orientation.

In another example, a method can be disclosed. The method can include receiving, at a first timeframe, calibration data from a first tool sensor, a second tool sensor, and a third tool sensor, where the first tool sensor is coupled to a first portion of a tool, a second tool sensor is coupled to a second portion of the tool, and a third tool sensor is coupled to a third portion of the tool, determining a calibration orientation of a major length of the tool from the calibration data, receiving, at a second timeframe, orientation data from the first tool sensor, the second tool sensor, and the third tool sensor, determining, from the orientation data, whether the major length of the tool is oriented substantially similarly to the calibration orientation, and providing, with a user interface, an indication of whether the major length of the tool is oriented substantially similarly to the calibration orientation.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of systems and techniques for tool positioning are described herein. In certain examples, a tool positioning system can be described. The tool positioning system can include a plurality of tool sensors, each tool sensor configured to be coupled to a portion of the tool, and a control module.

The tool can include a major length. The major length can be a length or axis along which the tool is operated. For example, the tool can be a drill and the major length can be an axis that defines the direction of drilling. In other examples, the major length can be direction of another operation of a tool (e.g., a direction of insertion for a rivet of a riveting tool, a direction of travel for a screw, and/or another such direction associated with operation of a tool).

The control module can include a user interface. The control module can be communicatively coupled to tool sensors and can receive calibration data from tool sensors to determine a calibration orientation of a major length of the tool. The calibration orientation can be a desired orientation (e.g., an orientation of the tool needed for proper operation of the tool). The control module can further receive orientation data from the tool sensors and determine, from the orientation data, whether the major length of the tool is oriented substantially similarly to the calibration orientation. The control module can then provide an indication of whether the major length of the tool is oriented substantially similarly to the calibration orientation.

Figure 1:
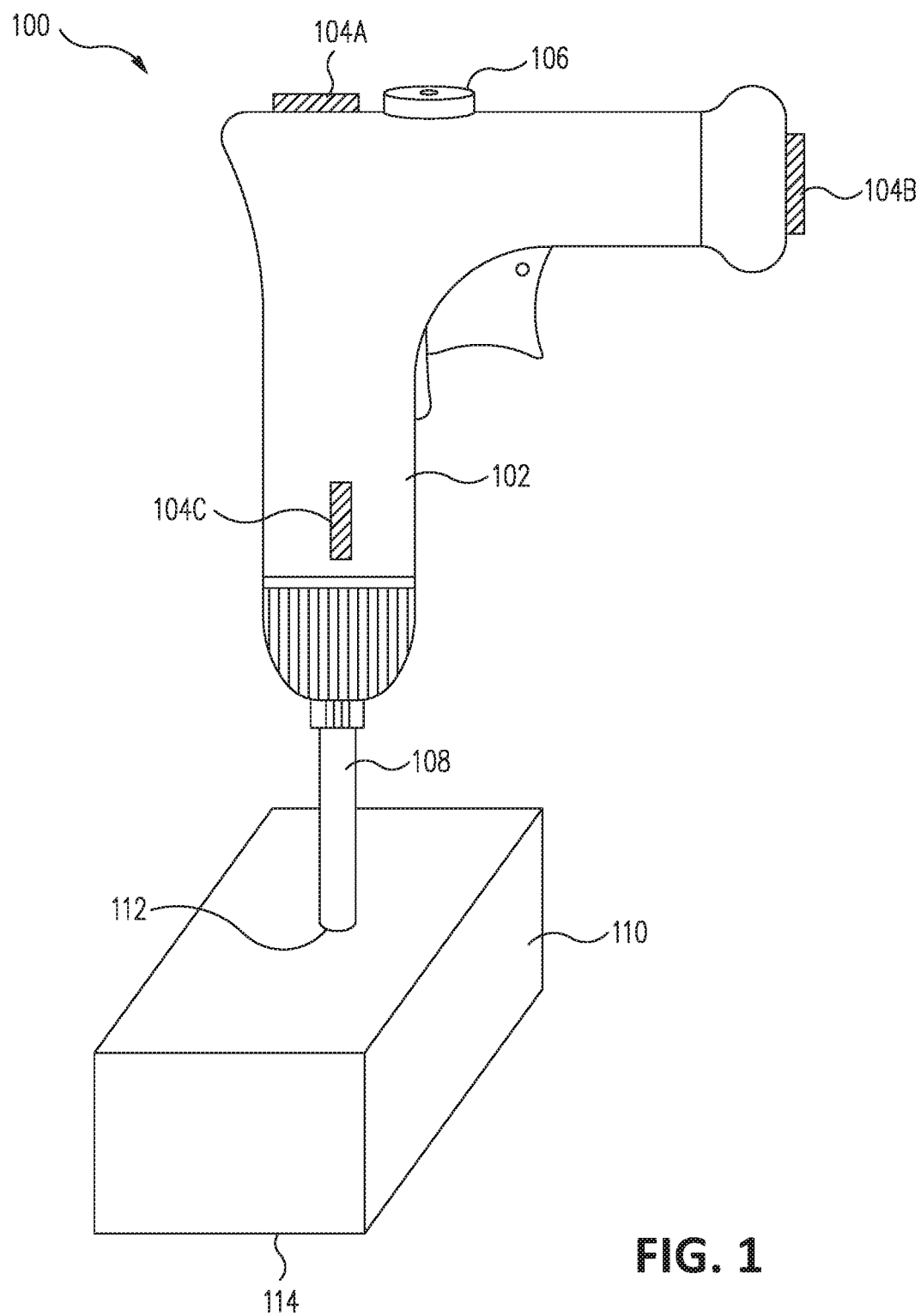
FIG. 1 illustrates an augmented tool in accordance with an example of the disclosure.

FIG. 1 illustrates an augmented tool in accordance with an example of the disclosure. Tool system 100 of FIG. 1 includes a tool 102, tool sensors 104A-C, a control module 106, a calibration insert 108, and a calibration block 110.

The tool 102 can, in certain examples, be a drill, rivet gun, welder, adhesive applicator, screwdriver, socket driver, and/or other such appropriate tool. The tool 102 can include a major length that defines a direction of operation of the tool 102. The direction of operation can be, for example, a direction of drilling, a direction of insertion of a rivet, a direction of travel for a screw, and/or another such direction of tooling operation. In certain examples, the major length of the tool 102 can be required to be oriented substantially (e.g., +/−10%) normally to a surface of a substrate.

Tool sensors 104A-C can be orientation and/or positioning sensors. In certain examples, each individual tool sensor 104A-C can be, for example, an accelerometer, a gyroscope, a gravity sensor, a global positioning sensor (GPS), and/or another type of sensor that can be used, singularly or in combination with one or more other sensors, to determine an orientation or position of an object that the sensor is coupled to. For example, tool sensors 104A-C can be an orientation sensor that can detect an orientation along one or more axes (e.g., detect an orientation along one or more perpendicular axes and/or detect rotation of the object). Such a sensor can, for example, detect gravity and determine the orientation from the detected gravity, be an accelerometer and determine changes in orientation from acceleration experienced and, thus, determine the current orientation, be a gyroscope, and/or detect orientation and/or positioning through another technique. The orientation of the tool 102 can, for example, be determined through triangulation of the sensor readings of the tool sensors 104A-C. While FIG. 1 illustrates three tool sensors 104A-C, other examples can include more or fewer tool sensors.

Tool sensors 104A-C can be coupled to different portions of the tool 102. For example, as shown in FIG. 1, tool sensor 104A can be coupled to a first portion of the tool 102, tool sensor 104B can be coupled to a second portion of the tool 102, and tool sensor 104C can be coupled to a third portion of the tool 102. The first, second, and third portions can be spaced away from each other. In such an example, the first, second, and third portions can be positioned at extremities (e.g., within 10% of the end of the tool 102 as determined by the length, width, and/or height of the tool 102) of the tool 102. Thus, for the substantially L shaped tool 102 (which can be, for example, a drill), the tool sensor 104A can be positioned on a top of the tool 102 near the bend of the "L," the tool sensor 104B can be positioned on an end of the tool 102, and the tool sensor 104C can be positioned on another end of the tool 102. The two ends where tool sensors 104B and 104C are positioned can be on portions of the tool 102 that are farthest, or close to the farthest, from each other.

Positioning the tool sensors 104A-C in such a spaced out manner can allow for the tool sensors 104A-C to more easily determine the orientation of the tool 102.

In certain examples, the tool sensors 104A-C can be configured to couple to the tool 102. For example, the tool sensors 104A-C can be separate sensors that a user can couple to the tool 102. The tool sensors 104A-C can be adhesively (e.g., with glue or tape), mechanically (e.g., with mechanical fasteners such as bolts or quick release mechanisms), and/or magnetically coupled to the tool 102. Thus, the user can dispose (e.g., retrofit by attaching) the tool sensors 104A-C (and other portions of the tool positioning and/or orientation system as described herein) on any existing tool.

The tool sensors 104A-C can be configured to communicate with the control module 106. The tool sensors 104A-C can electrically communicate with the control module 106 through wired or wireless communications techniques. For example, in a certain example, the tool sensors 104A-C can be connected to the control module 106 through one or more wired connections. In other examples, the tool sensors 104A-C can be connected to the control module 106 through one or more wireless communications techniques (e.g., through radiofrequency or RF communications, WiFi, Bluetooth, Near Field Communications, or other wireless communications standards). Accordingly, the tool sensors 104A-C can provide data to the control module 106.

The control module 106 can be a module configured to, at least, provide an indication of the orientation and/or position of the tool 102. The control module 106 can include, for example, a microprocessor, a microcontroller, a signal processing device, a memory storage device, and/or any additional devices to perform any of the various operations described herein. In various examples, the control module 106 and/or its associated operations can be implemented as a single device or multiple connected devices (e.g., communicatively linked through wired or wireless connections) to collectively constitute the control module 106.

The control module 106 can include one or more memory components or devices to store data and information. The memory can include volatile and non-volatile memory. Examples of such memory include RAM (Random Access Memory), ROM (Read-Only Memory), EEPROM (Electrically-Erasable Read-Only Memory), flash memory, or other types of memory. In certain examples, the control module 106 can be adapted to execute instructions stored within the memory to perform various methods and processes described herein, including implementation and execution of control algorithms responsive to sensor and/or user inputs.

The control module 106 can receive data from the tool sensors 104A-C. The control module 106 can receive such data and calibrate a desired orientation and/or position of the tool 102 and/or determine a current orientation and/or position of the tool 102. For example, the control module 106 can be placed in a calibration mode. The calibration mode can be used to determine a desired orientation for the tool 102.

To determine the calibration orientation, the tool 102 can be coupled to the calibration insert 108. In certain examples, the calibration insert 108 can be, for example, a blank bit configured to be coupled to the tool 102. The calibration insert 108 can additionally be inserted into an opening 112 of the calibration block 110 to determine a desired orientation for the tool 102. The opening 112 can be configured to receive the calibration insert 108. The calibration block 110 can include a flat surface 114 and a major axis of the opening 112 can be orthogonal to the flat surface 114.

In the calibration mode, when the calibration insert 108 is coupled to the tool 102 and inserted into the opening 112, the tool sensors 104A-C can determine the orientation of the tool 102 in one of more axes or degrees of freedom and transmit data indicating the orientation to the control module 106. For example, the calibration block 110 can be disposed on a surface of the substrate. The flat surface 114 can be disposed on the surface of the substrate to allow for determination of a desired orientation relative to the surface of the substrate.

The opening 112 can be configured to receive the calibration insert 108. In certain examples, the opening 112 can be shaped to correspond to the calibration insert 108 to snugly hold the calibration insert within the opening 112. For example, if the calibration insert 108 is of a cylindrical shape (e.g., with a circular or oval cross section), the opening 112 can be a corresponding cylindrical shape (e.g., with a circular or oval cross section). The cross section of such an opening 112 can be slightly larger than the cross section of the calibration insert 108 to allow for fitment of the calibration insert 108 within the opening 112. In other examples, the calibration insert 108 and/or the opening 112 can be other shapes (e.g., hexagonal, octagonal, square, triangular, and/or other such shapes).

Accordingly, inserting the calibration insert 108, when the calibration insert 108 is coupled to the tool 102, into the opening 112 can allow for determination of a substantially normal orientation (e.g., a desired orientation or calibration orientation) of the tool 102 relative to the surface of the substrate. The tool sensors 104A-C can then accordingly transmit data (e.g., calibration data) to the control module 106 indicating the orientation determined from the tool sensors 104A-C.

The control module 106 can store the data and/or the position indicated by the data as a desired orientation. The control module 106 can then be placed in an operating the mode. In the operating mode, the control module 106 can, from data provided by the tool sensors 104A-C, determine an orientation (and/or position) of the tool 102. For example, the tool sensors 104A-C can each provide data directed to the orientation of the tool 102 along one or more axes and/or degrees of freedom. In certain examples, a user interface of the control module 106 can provide an indication of the current orientation (e.g., a screen can communicate how many degrees from upright the tool 102 is currently). In another example, the control module 106 can match the stored data for the desired orientation of the tool 102 along the one or more axes and/or degree of freedom to the data received from the tool sensors 104A-C. When the data for one or more of the axes and/or degrees of freedom substantially match, the control module 106 can determine that the tool 102 is in the desired orientation and provide an indication as such.

In certain examples the control module 106 can determine the orientation of the tool 102 completely or primarily with data received from one, some, or all of the tool sensors 104A-C. Thus, in certain examples, the control module 106 can be configured to devalue or ignore data from one or more of the tool sensors 104A-C depending on the desired orientation of the tool 102. For example, the desired orientation of the tool 102 can be that the tool 102 is normal to the flat surface 114. However, the rotation of the tool 102 around the z-axis (e.g., the major axis of the calibration insert 108) can be of lesser importance in certain situations. In such situations, data directed to determining the orientation of the tool 102 with respect to rotation around the z-axis can be ignored or given lesser importance.

Thus, even if the control module 106 determines that the tool 102 is rotated around the z-axis in a manner different from that of the calibration orientation, the control module 106 can still determine that the tool 102 is oriented in the desired orientation if the control module 106 determines, for example, that the desired orientation is to position the tool 102 normal to the surface and the tool 102 is currently normal to the surface despite the difference in rotation. Thus, in certain such examples, the control module 106 can determine the orientation of the tool 102 from only the orientation of the tool sensors 102A-C with respect to one or more axes and not with respect to rotation.

For example, the control module 106 can determine that the tool 102 is oriented in the desired orientation even though the tool 102 is in any number of possible rotational positions around the major axis of the calibration insert 108. Thus, the tool 102 can be moved around the major axis of the calibration insert 108 while still being determined to be in the desired orientation.

In certain such examples, the tool 102 with the calibration insert 108 can be inserted into the calibration block 110. The calibration block 110 can then be placed on desired surface or plane and the control module 106 can determine the desired orientation as described herein. In certain examples, the tool 102 can be rotated 360 degrees (e.g., by a motor of the tool 102 or manually) to determine all possible orientations of the tool 102 that is normal to the surface or plane. In other examples, the tool 102 can automatically determine the major axis of the calibration insert 108 (e.g., as the tool 102 is configured to receive the calibration insert 108 along only one axis, the tool 102 can be programmed to automatically determine that the major axis of the calibration insert 108 is along that axis) and determine all possible positions of the tool 102 that are normal to the surface or plane from the major axis of the calibration insert 108.

In certain additional examples (e.g., examples where the tool 102 includes three, four, or five or more tool sensors 104), the control module 106 can determine desired orientations that are non-horizontal or vertical orientations. That is, the desired orientation can be an orientation normal to a sloped surface. The control module 106 can determine such a desired orientation by determining, from the data from the tool sensors (e.g., through three-dimensional triangulation or other techniques utilizing the data or by calculating rotational angles across all axes), a virtual plane that is parallel to the sloped surface. The control module 106 can then further determine that the desired orientation is for the major axis of the calibration insert 108 to be perpendicular to the virtual plane and determine the position of the tool 102 and whether the tool 102 is in the desired orientation accordingly.

In certain examples, the control module 106 can be configured to provide an indication (e.g., a visual, haptic, audio, and/or other type of indication) when the control module 106 determines that the tool 102 is oriented and/or positioned substantially similarly to the desired orientation and/or calibration orientation. For example, the control module 106 can provide a sound, turn on a light or provide a message, or vibrate when the control module 106 determines that the tool 102 is oriented and/or positioned substantially similarly to the desired orientation and/or calibration orientation. In other examples, the tool 102 can provide the indication.

As such, the tool system 100 of FIG. 1 illustrates an orientation and/or position system that can be retrofitted to existing tools. The system can alert the user when the tool 102 is in a desired orientation to allow for more convenient and accurate use of the tool 102 by the user.

Figure 2:
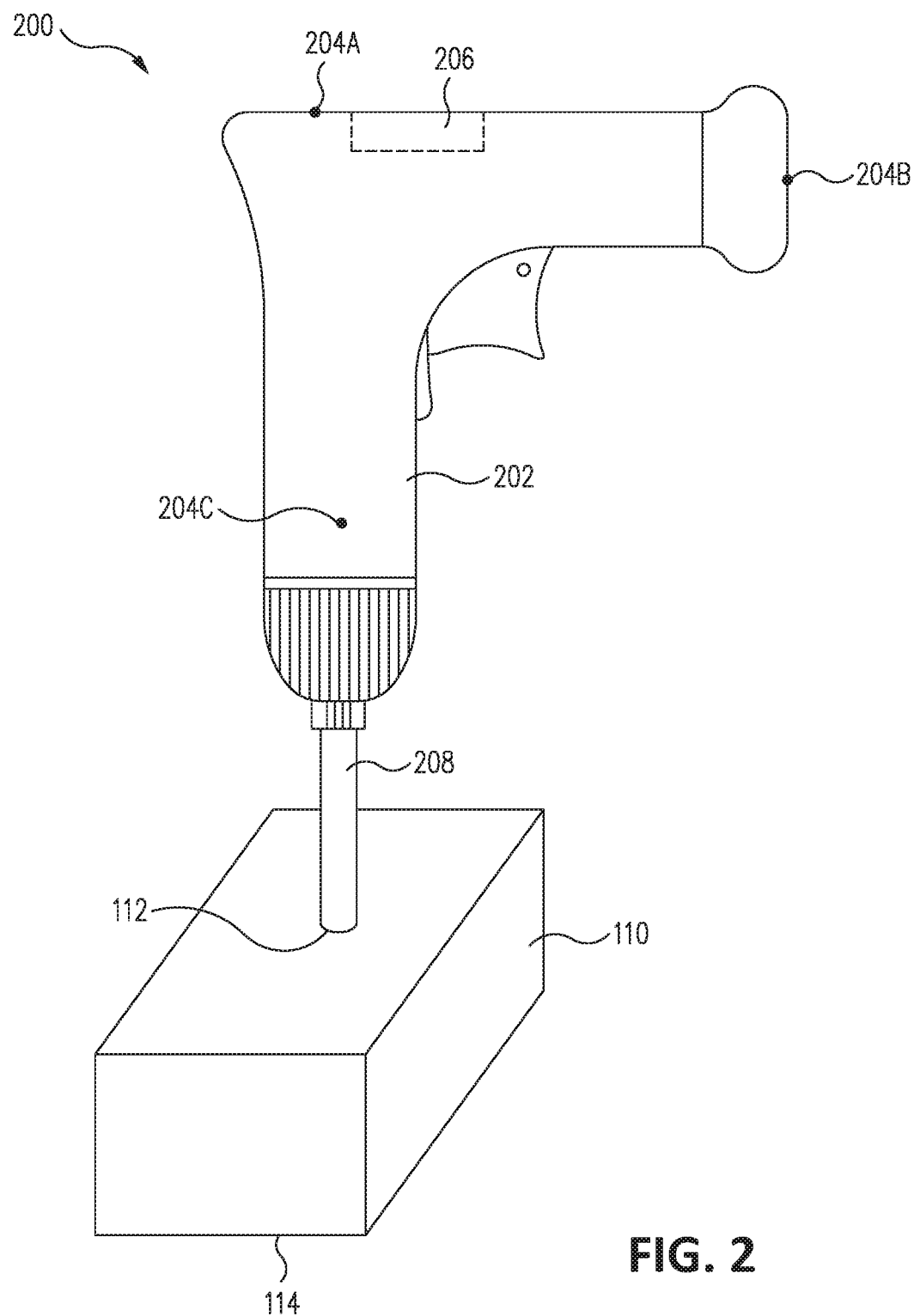
FIG. 2 illustrates another augmented tool in accordance with an example of the disclosure.

FIG. 2 illustrates another augmented tool in accordance with an example of the disclosure. FIG. 2 discloses a tool system 200. The tool system 200 includes the tool 202. The tool system 200 can additionally include the calibration insert 208 (similar to the calibration insert 108) and the calibration block 110.

The tool 202 can be similar to the tool 102, but can include integrated tool sensors 204A-C and/or an integrated control module 206. Thus, the tool 102 can include embedded tool sensors 204A-C and/or control module 206. The tool sensors 204A-C can be appropriately disposed (e.g., disposed substantially at extremities of the tool 202).

Figure 3:
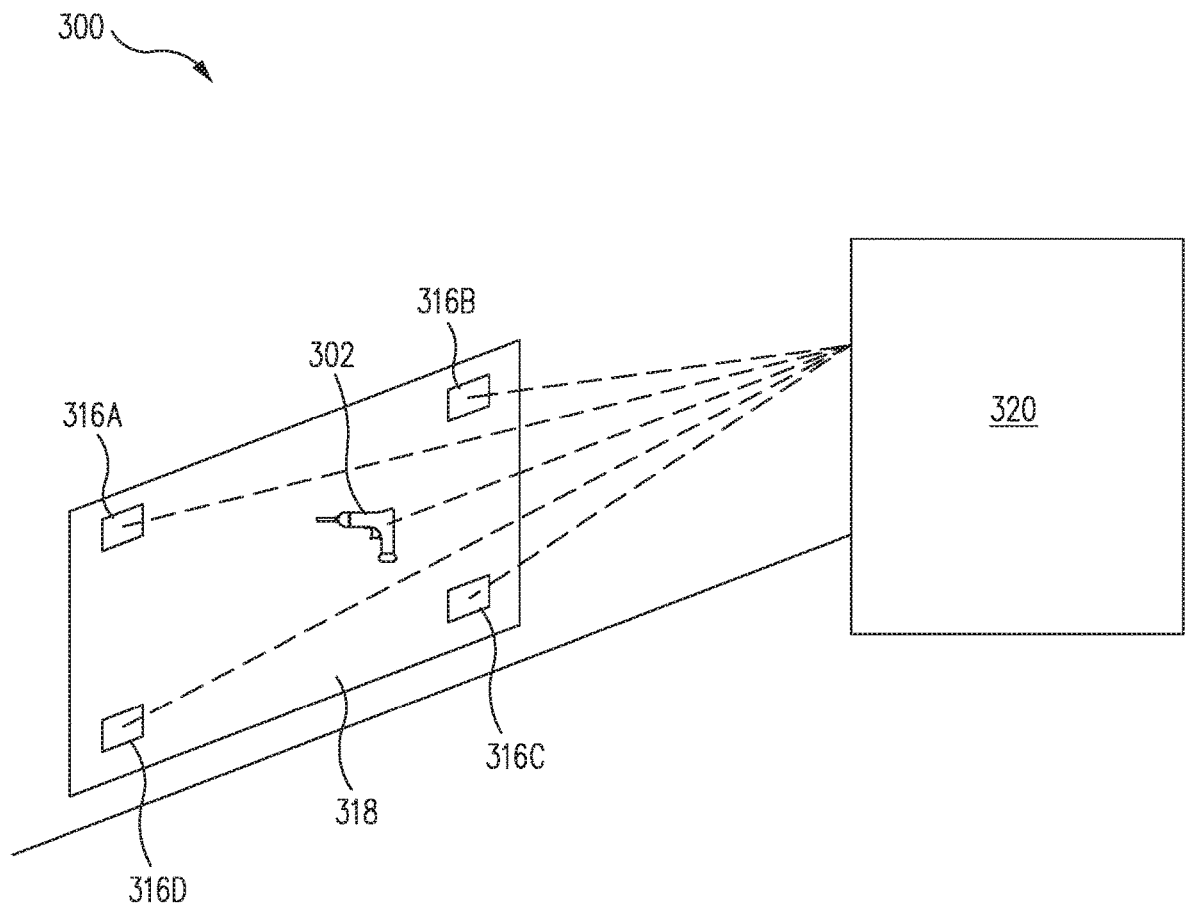
FIG. 3 illustrates a tool positioning system in accordance with an example of the disclosure.

FIG. 3 illustrates a tool positioning system in accordance with an example of the disclosure. The tool system 300 of FIG. 3 can include the tool 302, surface sensors 316A-D, a surface 318, and a system controller 320.

The tool 302 can be any type of tool as described herein. In certain examples, the tool 302 can include tool sensors and/or a control module as described herein. The control module of the tool 302 can communicate with the surface sensors 316A-D and/or the system controller 320. While the example of FIG. 3 includes four surface sensors 316A-D, other examples can include more or fewer surface sensors.

The surface sensors 316A-D can be disposed on different portions of the surface 318. The surface 318 can be a work surface for the tool 302 (e.g., the tool 302 can perform one or more tasks associated with the surface 318 such as welding or drilling portions of the surface 318). The surface sensors 316A-D can be positioned to allow for determination of the position of the tool 302 relative to the surface sensors 316A-D and, thus, allow for the determination of the position of the tool 302 on the surface 318.

The surface sensors 316A-D can be configured to communicate with the tool 302. For example, in a certain example, the tool 302 can communicate with each of the surface sensors 316A-D. The difference in time it takes to provide data between each of the surface sensors 316A-D and the tool 302 can be sensed to determine the position of the tool 302 relative to the surface sensors 316A-D. The position of the tool 302 relative to the surface sensors 316A-D can then accordingly be triangulated.

In certain examples, the system controller 320 can communicate with the surface sensors 316A-D and the tool 302. The system controller 320 can be configured to determine the position of the tool 302 (e.g., from data received from the surface sensors 316A-D and/or the tool 302). In certain examples, the system controller 320 can additionally include desired positions for the tool 302 on the surface 318. The surface 318 can be a tooling surface that the tool 302 needs to perform one or more actions with (e.g., drill a hole, provide a rivet, machine a surface). The desired positions can be specific points and/or areas on the surface 318 that the tool 302 should be positioned over to interface with the surface 318. Such points can be, for example, points where the tool 302 should drill on the surface 318. Thus, the system controller 320 can determine the position of the tool 302, determine if the position of the tool 302 matches the desired position, and accordingly provide feedback if the position of the tool 302 matches the desired position.

In certain examples, such desired positions can be determined from one or more models. For example, the desired positions can be determined from a computer aided design (CAD) model. The system controller 320 can include the CAD model and determine production processes from the CAD model.

Additionally, the system controller 320 can determine the tool type of the tool 302 (e.g., by communicating with the control module of the tool 302 and determining an identifying type of the tool 302) and determine the production processes that the tool 302 needs to perform in order to form the component of the CAD model. Determining the production processes can include determining the desired position and/or orientation on the surface 318 for each process. The system controller 320 can then detect the position and/or orientation of the tool 302 relative to the surface 318 and provide an indication (e.g., an audio, visual, and/or haptic indication) when the position and/or orientation of the tool 302 matches the desired position and/or orientation.

Figure 4:
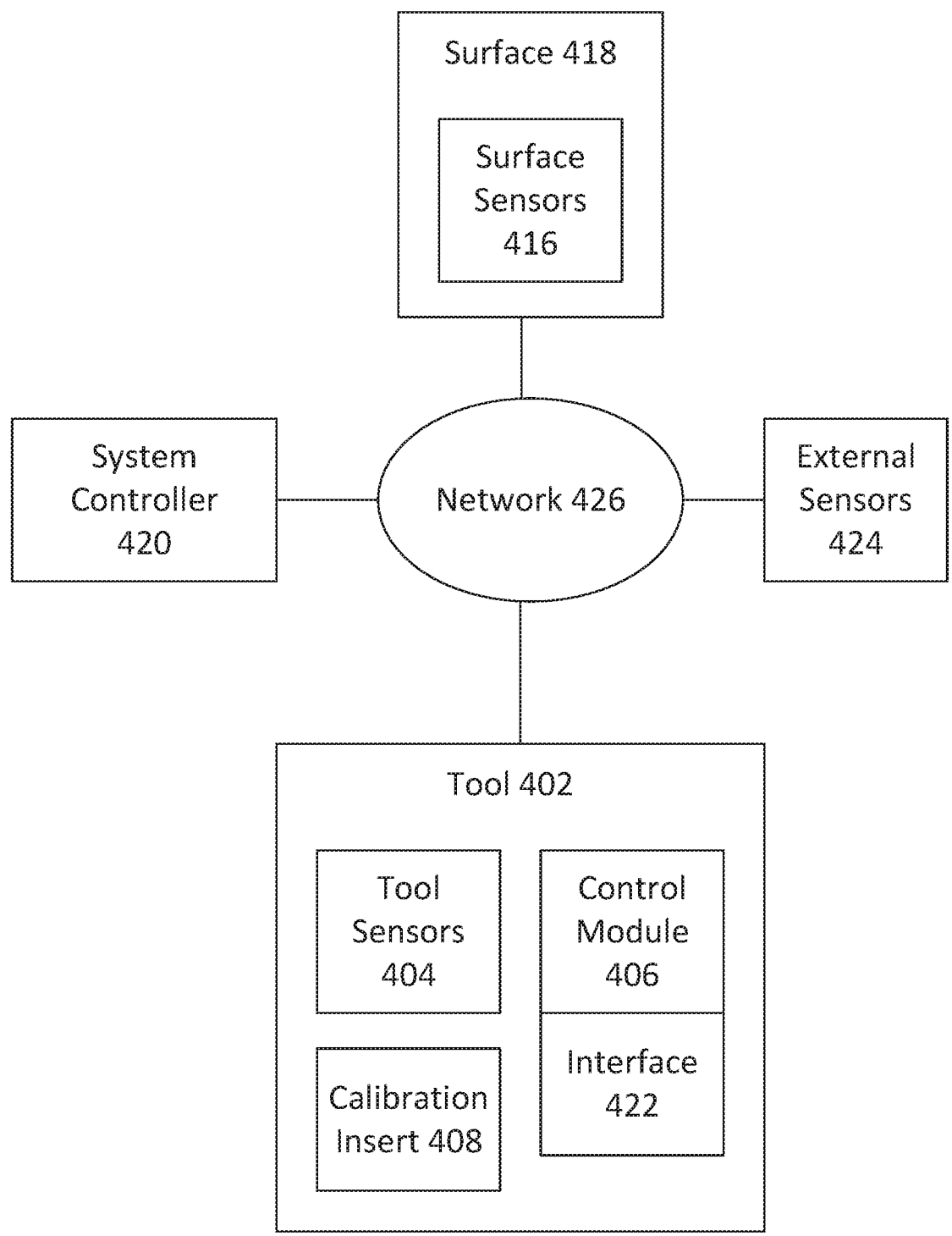
FIG. 4 illustrates a block representation of a tool positioning system in accordance with an example of the disclosure.

FIG. 4 illustrates a block representation of a tool positioning system in accordance with an example of the disclosure. FIG. 4 illustrates system controller 420, surface 418, tool 402, network 426, and external sensors 424. In various examples, the system controller 420, components of the surface 418 or components coupled to the surface 418, the external sensors 424, and/or the tool 402 or components thereof can be communicatively coupled via the network 426. The network 426 can be a short ranged network (e.g., a WiFi, Bluetooth, or other such network) or can be a long range network (e.g., an Ethernet network or internet network).

Surface 418 can be similar to the surface 318 of FIG. 3. The surface 418 can include one or more surface sensors 416 coupled to the surface 418. In certain examples, the surface sensors 416 can be removably coupled to the surface 418 and/or permanently coupled (e.g., embedded) within the surface 418.

The system controller 420 can be similar to the system controller 320 of FIG. 3. Thus, the system controller 420 can receive data through the network 426 and determine the orientation and/or position of the tool 402 accordingly.

The tool 402 can include one or more tool sensors 404, the control module 406, the calibration insert 408, and an interface 422. The tool sensors 404, the control module 406, and the calibration insert 408 can be similar to corresponding components of the tools described herein. The interface 422 can be a user interface configured to communicate with the user of the tool 402. In certain examples, the interface 422 can be coupled to the control module 406 or be a portion of the control module 406. For example, the interface 422 can be a speaker, haptic feedback device, light, and/or display coupled to the control module 406 and configured to provide information to the user.

The external sensors 424 can be sensors not coupled to the surface 418 and/or the tool 402. The external sensors 424 can be configured to determine or aid in the determination of the orientation and/or position of the tool 402. For example, the external sensors 424 can be one or more external cameras configured to provide video data to allow for determination of the orientation of the tool 402 from the video data. In another example, the external sensors 424 can be a GPS device that allows for determination of the position of the tool 402 through GPS signals.

Figure 5:
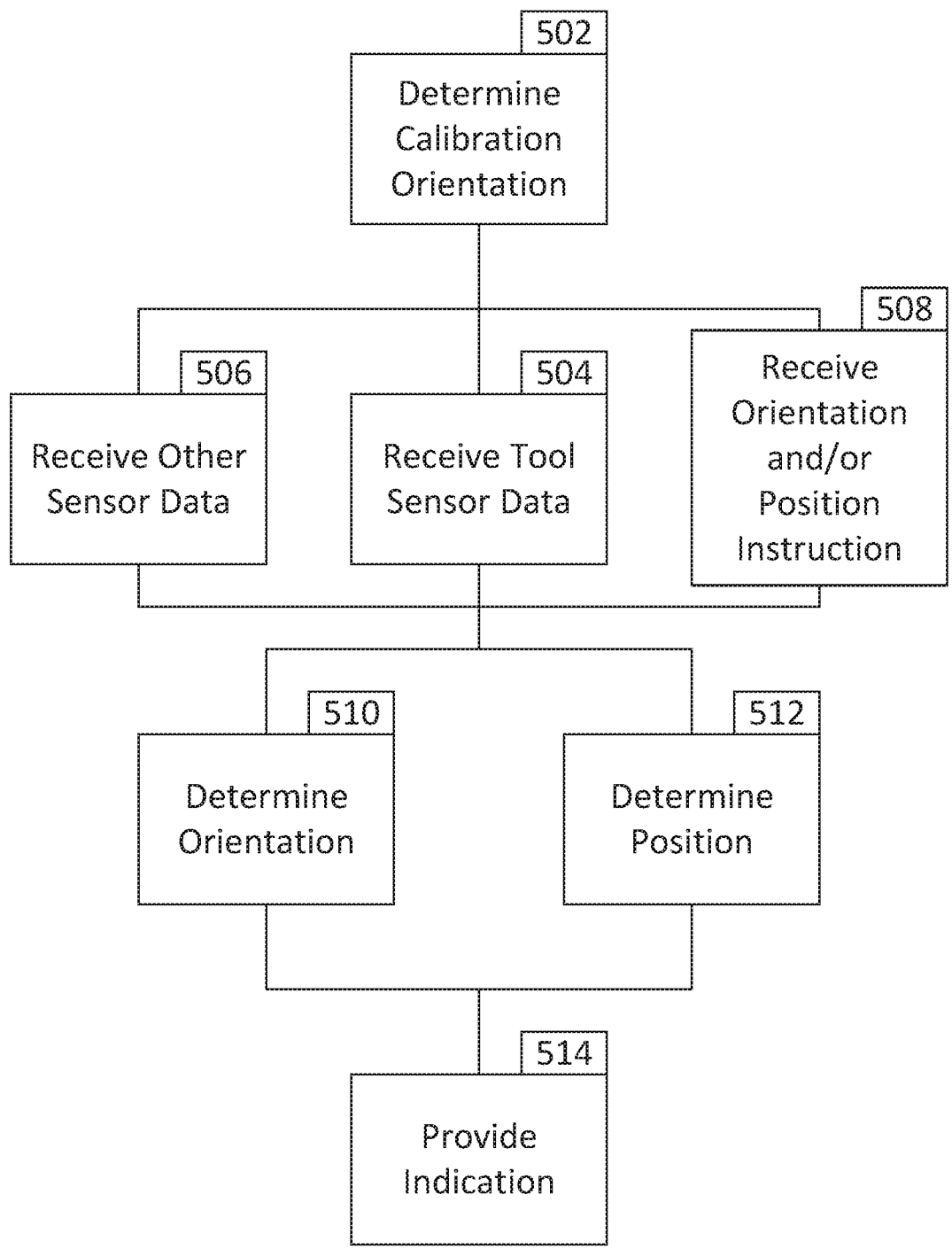
FIG. 5 illustrates a block diagram of a technique of operating a tool positioning system in accordance with examples of the disclosure.

FIG. 5 illustrates a block diagram of a technique of operating a tool positioning system in accordance with examples of the disclosure. In block 502, a calibration orientation can be determined for a tool. The calibration orientation can be determined by placing the tool into a calibration mode and determining the calibration orientation, as described herein, or through pre-determined calibration orientations (e.g., one or more calibration orientations can be pre-determined and a user can select a desired pre-determined calibration orientation).

After determination of the calibration orientation, tool sensor data can be received in block 504, other sensor data can be received in block 506, and/or orientation and/or position instruction can be received in block 508. The tool sensor data can be data from the tool sensors as described herein. The other sensor data can be data from one or more surface sensors and/or other external sensors (e.g., GPS data). The orientation and/or position instructions can be a desired orientation and/or position for the tool. In certain examples, the desired orientation can be the calibration orientation, but other examples can include other (e.g., pre-stored) orientations and/or desired positions.

After receiving the data and instructions in blocks 504-508, the orientation of the tool can be determined in block 510 and the position of the tool can be determined in block 512. If one or both of the orientation or the position of the tool is determined to match the desired orientation and/or position (e.g., determined to match the calibration orientation), an indication can be provided in block 514. The indication can be an audio, haptic, visual, and/or other type of indication from the tool. The indication can alert a user of the tool that the tool is in the desired orientation and/or position. The tool can then be used to perform the desired operation.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
 a first tool sensor configured to be coupled to a first portion of a tool;
 a second tool sensor configured to be coupled to a second portion of the tool;
 a third tool sensor configured to be coupled to a third portion of the tool; and
 a control module comprising a user interface and configured to:
  communicatively couple to the first tool sensor, the second tool sensor, and the third tool sensor; and
  perform operations comprising:
   receiving, at a first timeframe, calibration data from the first tool sensor, the second tool sensor, and the third tool sensor;
   determining a calibration orientation of a major length of the tool from the calibration data;
   receiving, at a second timeframe, orientation data from the first tool sensor, the second tool sensor, and the third tool sensor;
   determining, from the orientation data, whether the major length of the tool is oriented in accordance with the calibration orientation; and
   providing, by the user interface, an indication of whether the major length of the tool is oriented in accordance with the calibration orientation.

2. The apparatus of claim 1, wherein the first portion, the second portion, and the third portion are extremities of the tool.

3. The apparatus of claim 1, wherein the first tool sensor, the second tool sensor, and/or the third tool sensor are configured to be adhesively, mechanically, and/or magnetically coupled to the tool.

4. The apparatus of claim 1, wherein the indication comprises an audible sound and/or a visual indication, and wherein the user interface comprises a speaker and/or a light.

5. The apparatus of claim 1, wherein the control module is configured to wirelessly communicatively couple to the first tool sensor, the second tool sensor, and the third tool sensor.

6. The apparatus of claim 1, wherein the first tool sensor, the second tool sensor, and/or the third tool sensor comprises an orientation and/or positioning sensor.

7. The apparatus of claim 1, further comprising:
 a fourth tool sensor configured to be coupled to a fourth portion of the tool, wherein the control module is further communicatively coupled to the fourth tool sensor.

8. The apparatus of claim 1, further comprising a calibration block having an opening configured to receive a calibration insert coupled to the tool, wherein the calibration orientation is determined by inserting the calibration insert into the opening.

9. The apparatus of claim 8, wherein the calibration block comprises a flat surface, and wherein the opening is substantially orthogonal to the flat surface.

10. The apparatus of claim 1, further comprising the tool, wherein the first tool sensor, the second tool sensor, the third tool sensor, and the control module are coupled to the tool.

11. The apparatus of claim 10, wherein the tool is a drill.

12. The apparatus of claim 10, further comprising a calibration insert coupled to the tool and configured to be inserted into an opening of a calibration block, wherein the operations further comprise:
 determining that the calibration insert is inserted into the opening; and
 placing, based on the determining whether the calibration insert is inserted into the opening, the control module into a calibration mode, wherein the receiving the calibration data is based on the control module being placed into the calibration mode.

13. The apparatus of claim 12, wherein the operations further comprise:
 receiving a first input from the user interface, wherein the receiving the calibration data is further based on the receiving the first input.

14. The apparatus of claim 1, further comprising a surface sensor configured to be coupled to a tooling surface, wherein the surface sensor is configured to communicatively couple to the control module, and wherein the operations further comprise:
 determining, from data from the surface sensor, a position of the tool on the tooling surface, wherein the indication is provided based additionally on the position of the tool.

15. The apparatus of claim 14, further comprising a system controller communicatively coupled to the control module, wherein the operations further comprise:
 determining a desired position for the tool; and
 determining whether the position of the tool substantially matches the desired position, wherein the indication is provided based additionally on the determining whether the position of the tool substantially matches the desired position.

16. A method comprising:
 receiving by the apparatus of claim 1, at the first timeframe, calibration data from the first tool sensor, the second tool sensor, and the third tool sensor, wherein the first tool sensor is coupled to the first portion of the tool, the second tool sensor is coupled to the second portion of the tool, and the third tool sensor is coupled to the third portion of the tool;
 determining, by the apparatus, the calibration orientation of the major length of the tool from the calibration data;
 receiving by the apparatus, at the second timeframe, orientation data from the first tool sensor, the second tool sensor, and the third tool sensor;
 determining by the apparatus, from the orientation data, whether the major length of the tool is oriented in accordance with the calibration orientation; and
 providing, with the user interface, the indication of whether the major length of the tool is oriented in accordance with the calibration orientation.

17. The method of claim 16, wherein the first portion, the second portion, and the third portion are extremities of the tool.

18. The method of claim 16, further comprising:
 determining whether a calibration insert of the tool is inserted into an opening of a calibration block, wherein the calibration data is received based on the determining whether the calibration insert is inserted into the opening.

19. The method of claim 18, further comprising:
 receiving a first input from the user interface, wherein the receiving the calibration data is further based on the receiving the first input.

20. The method of claim 16, further comprising:
determining a desired position for the tool;
determining, from data received from a surface sensor coupled to a tooling surface, a position of the tool on the tooling surface; and
determining whether the position of the tool substantially matches the desired position, wherein the indication is provided based additionally on the determining whether the position of the tool substantially matches the desired position.

* * * * *